United States Patent
Daniels

[15] 3,652,304
[45] Mar. 28, 1972

[54] NITRIDE-OXIDE REFRACTORIES

[72] Inventor: Alma U. Daniels, Wilmington, Del.

[73] Assignee: E. I. du Pont de Nemours and Company, Wilmington, Del.

[22] Filed: Nov. 21, 1969

[21] Appl. No.: 878,893

[52] U.S. Cl. ................................................106/57, 106/65
[51] Int. Cl. .........................................................C04b 35/58
[58] Field of Search ..........................................106/57, 65, 55

[56] References Cited

UNITED STATES PATENTS 3,143,413  8/1964  Krapf.......................................106/43

FOREIGN PATENTS OR APPLICATIONS 1,048,530  1/1959  Germany ................................106/57

Primary Examiner—James E. Poer
Attorney—John R. Powell

[57] ABSTRACT

Homogeneous non-porous compositions having an average grain size of less than about 10 microns, a density in excess of 95 percent of theoretical and consisting essentially of 1. 10 to 50 volume percent of alumina, zirconia or their mixtures; and
2. 50 to 90 volume percent of a nitride of titanium, tantalum, zirconium, hafnium or their mixture; demonstrate unusual resistance to frictional wear and chemical attack.

6 Claims, No Drawings

3,652,304

NITRIDE-OXIDE REFRACTORIES

BACKGROUND OF THE INVENTION

Dense compositions containing nitrides of titanium, zirconium, hafnium or tantalum and oxides of zirconium and aluminum are known in the art as disclosed in application Serial No. 776,741 filed Nov. 18, 1968. However, such compositions require the presence of a binder metal. It has customarily been the view that binder metals are necessary in such compositions to achieve density at reasonable temperatures and pressures. I have discovered that the nitride-oxide mixtures of this invention can be hot-pressed to theoretical density at relatively low temperatures and pressures. This appears to be possible because the oxides and nitrides serve as mutual pressing aids. The resultant compositions are very resistant to corrosion and high-temperature oxidation as compared to metal-bonded compositions. They are also very resistant to frictional wear and are useful for equipment and parts which contact molten metals, corrosive liquids or corrosive gases, especially at high temperatures.

SUMMARY

In summary, this invention is directed to refractory compositions consisting essentially of
1. 10 to 50 volume percent of alumina, zirconia or their mixtures; and
2. 50 to 90 volume percent of a nitride of titanium, tantalum, zirconium, hafnium or their mixtures;

said composition having an average grain size of less than 10 microns and a density in excess of 95 percent of theoretical density.

Such compositions are very resistant to frictional wear, corrosion and high-temperature oxidation.

DESCRIPTION OF THE INVENTION

The refractory compositions of this invention are dense, fine-grained solids consisting essentially of from 10 to 50 volume percent of alumina, zirconia or their mixtures and from 50 to 90 volume percent of titanium nitride, zirconium nitride, tantalum nitride, hafnium nitride or their mixtures. The compositions have an average grain size of less than 10 microns and a density in excess of 95 percent of their theoretical density.

COMPONENTS a. Oxides

The oxides suitable for use in this invention are alumina, zirconia and their mixtures, and they are used in amounts of from 10 to 50 volume percent. It is preferred to use the oxides in amounts ranging from 20 to 40 volume percent and most preferably from 25 to 35 volume percent.

The alumina and zirconia suitable for use in this invention should have an average particle size of less than 5 microns and preferably less than 2 microns. Most preferably the starting oxides will have an average particle size of less than 0.5 micron and it is preferred to use alumina rather than zirconia or alumina-zirconia mixtures.

The oxides can be prepared by any of the well-known conventional methods or they can be obtained commercially. A suitable commercially available alumina is Alcoa Superground Alumina XA-16 with a specific surface area of about 13 square meters per gram. Suitable zirconia can be obtained as —325 mesh grade powder from Metals for Industry Inc.

b. Nitrides

The nitrides suitable for use in this invention are the nitrides of titanium, tantalum, hafnium, zirconium or their mixtures and they are used in amounts ranging from 50 to 90 volume percent. It is preferred to use the nitrides in amounts ranging from 60 to 80 volume percent and most preferably from 65 to 75 volume percent.

The nitrides suitable for use in this invention should have an average particle size of less than 5 microns and preferably less than 2 microns. It is also preferred to use titanium nitride over the other nitrides or mixed nitrides.

The nitrides can be prepared by conventional methods such as disclosed in "Nitrides" Chapter VIII of "High Temperature Technology"; by J. M. Blocker, Jr., John Wiley and Sons, N. Y. 1956; by nitriding the corresponding finely milled hydrides as described in U.S. Pat. No. 3,409,416; or by suitable reaction in molten salt as described in U.S. Pat. No. 3,409,419. They can also be obtained commercially as —325 mesh grade powders from Materials for Industry Inc. or Consolidated Astronautics Inc.

c. Impurities

The oxides and nitrides suitable for use in this invention should be quite pure. In particular, it is important that they be substantially free of impurities such as oxygen which have deleterious effects on the solid compositions.

Minor amounts of refractory impurities such as other oxides, nitrides or carbides have no deleterious effect on the solid compositions. Thus small amounts of such refractory impurities as are ordinarily picked up in mix-milling or in grinding the components are tolerable. However, it is preferred that the compositions of this invention be kept substantially free of metal impurities as the presence of metal in the dense compositions tends to reduce corrosion resistance, wear resistance and high temperature oxidation resistance.

PREPARATION

The dense compositions of this invention are prepared by hot-pressing homogeneous powder mixtures of the oxides and nitrides. The homogeneously powders oxide-nitride posders can be prepared in the manner disclosed in U.S. Pat. No. 3,409,416 or U.S. Pat. No. 3,409,419.

The powder mixtures are hot-pressed into dense compositions in the general manner also disclosed in U.S. Pat. No. 3,409,416 and 3,409,419, as well as U.S. Pat. No. 3,413,392. The temperature range for hot-pressing the compositions of this invention runs generally from about 1,700° C. to about 1,900° C. and the pressure from about 1,000 pounds per square inch to about 6,000 pounds per square inch.

REFRACTORY COMPOSITIONS

The dense refractory products of this invention consist essentially of 10 to 50 volume percent of alumina, zirconia or their mixtures and 50 to 90 volume percent of titanium nitride, tantalum nitride, zirconium nitride, hafnium nitride or their mixtures. Preferred compositions of this invention contain from 20 to 40 volume percent oxide and from 60 to 80 volume percent nitride. The most preferred compositions contain 25 to 35 volume percent oxide and 65 to 75 volume percent nitride. The preferred compositions demonstrate a very desirable combination of physical properties and characteristics.

The dense compositions of this invention are characterized by an absence of porosity which translates into a density in excess of 95 percent of theoretical density and preferably greater than 99 percent of theoretical density.

The dense compositions of this invention are also characterized by an average grain size of less than 10 microns and preferably less than 2 microns.

In addition to low porosity and fine-grained structure, the compositions of this invention are very resistant to corrosion and frictional wear, being quite tough, as hard as 93.5 $R_A$ and having strengths as high as 135,000 pounds per square inch. Determination of mechanical strengths and hardness are made by conventional transverse rupture and Rockwell A methods.

Methods for determining porosity, grain size and homogeneity of the dense compositions are described in U.S. Pat. No. 3,409,416. Toughness is determined only qualitatively by allowing a dense composition to fall freely to a hardwood floor from a height of 7 feet. The compositions of this invention do not chip or crack under these conditions.

The actual density of the refractory compositions can be determined by any recognized method, and most simply by weighing in air, and immersed in water, a sample which has been previously measured. The water should be boiled before weighing the sample to remove dissolved air. The density is calculated from the formula $$\text{Density} = \frac{\text{Weight in air} \times \text{specific gravity of water}}{\text{Weight in air} - \text{weight in water}}$$

The theoretical density for a refractory composition is calculated on the basis that the volume for a given weight of the composition is equal to the sum of the volumes of the components calculated from the weight of each component divided by its density.

UTILITY

The refractory compositions of this invention are valuable for uses requiring resistance to frictional wear, corrosion and high temperature oxidation. Thus they can be used to fabricate parts and equipment for use in contact with molten metals, corrosive liquids and corrosive gases.

The compositions of this invention are particularly useful in making dies, crucibles and casting molds for molten metals and in fabricating articles of jewelry such as watch cases.

This invention is further illustrated in the following examples wherein parts and percentages are by weight unless otherwise noted.

EXAMPLE 1

This is an example of a composition containing 70 volume percent of titanium nitride and 30 volume percent of alumina.

The titanium nitride used is grade −325 mesh powder, available from Materials for Industry, Inc., and has a specific surface area of 1.1 square meters per gram as determined by nitrogen adsorption. An electron micrograph of the powder shows dense particles of irregular shapes with sizes between 1 and about 10 microns, the bulk being between 1 and 2 microns. The carbon content is 0.33 percent and the oxygen is 0.87 percent. Chemical analysis reveals 76.19 percent of titanium and 18.71 percent of nitrogen.

The alumina used is very finely divided alpha alumina, commercially available as Alcoa Superground Alumina XA–16 and is characterized by X-ray examination as pure alpha alumina. It has a specific surface area of about 13 square meters per gram, which is equivalent to a spherical particle size of about 115 millimicrons. Under an electron microscope, this alpha alumina powder appears as aggregates of alumina crystallites in the range of 100 to 150 millimicrons in diameter.

The powders are milled by loading 6000 parts of preconditioned cylindrical cobalt-bonded tungsten carbide inserts, one-fourth inch long and one-fourth inch in diameter, into a 1.3 liter steel rolling mill about 6 inches in diameter, also charged with 290 parts of "Soltrol" 130 saturated paraffinic hydrocarbon, boiling range 165°–210° C. The mill is then charged with 114 parts of the titanium nitride and 35.8 parts of the alpha alumina powder as above described.

The mill is sealed and rotated at 90 revolutions per minute for 5 days. The mill is then opened and the contents emptied while keeping the milling inserts inside. The mill is then rinsed out with "Soltrol" 130 several times until all of the milled solids are removed.

The milled powder is transferred to a vacuum evaporator, and the excess hydrocarbon is decanted off after the suspended material has settled. The wet residual cake is dried under vacuum with the application of heat until the temperature within the evaporator is between 200° and 300° C., and the pressure is less than about 0.1 millimeters of mercury. Thereafter the powder is handled entirely in the absence of air.

The dry powder is passed through a 70 mesh screen in a nitrogen atmosphere, and then stored under nitrogen in sealed plastic containers.

A watch case is prepared from this powder by hot pressing the powder in a graphite mold assembly designed in such a way as to permit hot pressing the powder in the shape of a ring with a round hole of a size into which the encased operating works of a watch can later be press-fitted, the ring serving as a protective and decorative case. The graphite mold consists of a 4 inch long hollow cylinder of graphite with an outside diameter of 2½ inches, the cross-section of the cavity being in the shape of a square with rounded sides. The maximum inside diameter of the cylinder is 2 inches. A hollow piston is placed into the bottom end of the cylindrical mold, the outside diameter of the piston fitting snugly into the inside diameter shape of the mold. The piston has a cylindrical cavity with a 1⅙ inch round cross-section. The end of the piston in the mold is tapered or dished so that the bottom of the ring to be formed from the powder will have a more decorative rounded rather than a flat surface. A third hollow cylinder with an outside diameter of about 1⅙ inches and a wall thickness of one-sixteenth inch fits snugly into the hollow piston and extends up beyond the piston into the mold. The end of the lower graphite ram of the press is of such a diameter that it slides into the thin-walled inner cylinder to keep it from collapsing during the pressing operation, the shoulder on the ram engaging with the bottom piston in the mold to transmit pressure to the sample. 24 parts of powder is charged to the mold and the mold is tapped so that the powder packs in the cavity formed by the inner wall of the mold, the outer surface of the thin-walled cylindrical spacer and the upper hollowed end of the bottom piston. A second hollow piston is then fitted into the assembly from the top to provide the upper surface for the powder cavity. The entire assembly is placed in the furnace of a vacuum hot press, the mold is held in a vertical position, and the pistons extending above and below are engaged between opposite graphite rams of the press.

The temperature of the furnace is increased rapidly to 1,000° C. while the position of the rams is locked so as to prevent further movement during the heat-up period. A pressure of about 250 pounds per square inch is then applied to the sample and the temperature is raised from 1,000° to 1,800° C. in 10 minutes, and the temperature of the mold is held at 1,800° C. for another 2 minutes to ensure uniform heating of the sample. A pressure of 5,000 pounds per square inch is then applied through the pistons for 4 minutes. After 4 minutes at 1,800° C. and 5,000 pounds per square inch the furnace is shut off and the pressure is released. Immediately after pressing, the bottom ram is withdrawn, removing the internal support from the thin walled inner cylinder, and the mold and contents are allowed to cool in the furnace.

After cooling the mold is removed from the furnace and the intact watch case is recovered and blasted with abrasive grit to remove any adhering carbon. The density is measured as 5.00 grams per cubic centimeter, which is more than 99 percent of the theoretical density. The average grain size is measured and found to be less than 10 microns.

The watch case is polished by pressing its faces firmly against rotating diamond impregnated cloth discs. A Buehler, Ltd. machine is used in this operation for polishing the sample. A 400 grit diamond wheel is used at 1,175 revolutions per minute in the first polishing step and a 1,000 grit diamond wheel at 550 revolutions per minute is used in a second, finishing step.

The finished watch case fabricated in this manner has an attractive golden color.

EXAMPLE 2

The procedure of Example 1 is repeated using tantalum nitride powder and zirconium oxide powder as components to give a composition containing 50 volume percent tantalum nitride and 50 volume percent zirconium oxide.

The tantalum nitride used is powder of a grade 0.5 to 5 microns available from Materials for Industry, Inc., and has a specific surface area of 1.2 square meters per gram as determined by nitrogen adsorption. An electron micrograph of the powder shows dense particles with sizes between 1 and about 10 microns and some somewhat larger. The oxygen content is 0.25 percent.

The zirconium oxide powder used is commercially available under the trade name of "Zircoa" AMC. This powder has an average particle size of 1.3 microns as measured with the Fisher Sub-Sieve Sizer, and has a nitrogen specific surface area of 1 square meter per gram. Chemical analysis of this zirconium oxide shows that it contains 0.1 percent of calcium oxide.

The amounts of components loaded in the 1.3 liter steel mill are 211.3 parts of tantalum nitride and 83.9 parts of zirconium oxide.

A 2 inch diameter, 2 inch high crucible is prepared from the powder by hot pressing the powder in graphite molds of suitable shape and size, fitted with opposing close-fitting pistons. One piston is held in place in one end of the mold cavity while the powder is dropped into the cavity under nitrogen and evenly distributed by rotating the mold and tapping it lightly on the side. The upper piston is then put in place under hand pressure. The assembled mold and contents are then placed in a vacuum chamber of a vacuum hot press, the mold is held in a vertical position, and the pistons extending above and below are engaged between opposing graphite rams of the press under pressure of about 600 pounds per square inch. Within a period of a minute the mold is raised into the hot zone of the furnace at 1,175° C. and at once the furnace temperature is increased from 1,175° to 1,800° C. in 10 minutes, and the temperature of the mold is held at 1,800° C. for another 2 minutes to ensure uniform heating of the sample. A pressure of 4,000 pounds per square inch is then applied through the pistons for 4 minutes. Immediately after pressing, the mold and contents, still being held between the opposing rams, is moved out of the furnace into a cool zone where the mold and contents are cooled to dull red heat in about 5 minutes.

The mold and contents are then removed from the vacuum furnace and the crucible is removed from the mold and is blasted with abrasive grip to remove any adhering carbon.

Density of the finished piece as determined by accurate weighing and measurement of the dimensions is 10.75 grams per cubic centimeter, which is over 99 percent of the theoretical density.

The hot pressed composition is essentially nonporous when examined under 1,000 × magnification. This property is important since nonporous materials are more corrosion resistant than porous materials of the same chemical composition. Structurally the composition consists of extremely fine continuous interpenetrating networks of tantalum nitride and zirconium oxide, with an average grain size of less than 10 microns.

The crucible is quite tough and does not break or chip when dropped freely to a hardwood floor from a height of 7 feet.

A crucible fabricated as described above can be used to hold molten metals and the hot melt will not stick to the crucible.

EXAMPLE 3

The procedure of Example 1 is repeated except that the components are used in amounts to give a composition containing 50 volume percent titanium nitride, 35 volume percent zirconium nitride, 10 volume percent aluminum oxide, and 5 volume percent zirconium oxide.

The zirconium nitride powder used in this preparation is commercially available, grade −325 mesh from Materials for Industry, Inc., Ambler, Pa. The powder is 99.5 percent pure.

The actual amounts of components loaded in the 1.3 liter steel mill are 81.4 parts of titanium nitride, 74.4 parts of zirconium nitride, 11.9 parts of aluminum oxide and 8.3 parts of zirconium oxide.

A consolidated billet is prepared from the powder by hot pressing the powder in a cylindrical graphite mold having a cavity with a square cross section 1 1/16 inches × 1 1/16 inches and fitted with opposing close-fitting pistons. The hot pressing procedure of Example 2 is repeated except that the maximum temperature at which the mold is held is 1,850° C.

Density of the finished piece as determined by accurate weighing and measurement of the dimensions is 5.87 grams per cubic centimeter, which corresponds to the theoretical density.

The hot pressed composition is essentially nonporous when examined under 1,000 × magnification. Electron micrographs indicate a very fine grain structure, few grains exceeding 1 or 2 microns in size.

The consolidated billet is cut so that specimens 0.070 inch × 0.070 inch × 1 inch are obtained. The transverse rupture strength is measured on these specimens and is 80,000 pounds per square inch. Hardness is 92.5 $R_A$.

A billet of this composition has excellent oxidation resistance and corrosion resistance and is electrically conducting. It is very hard and tough and molten metals do not stick to it.

A material with these properties can be used with advantage as an electrode in melts and as a crucible for molten metals.

EXAMPLE 4

The procedure of Example 1 is repeated except that the components are used in amounts to give a composition containing 60 volume percent titanium nitride and 40 volume percent aluminum oxide.

The hot pressing procedure of Example 3 is used to obtain a consolidated billet with a square cross section 1 1/16 inches × 1 1/16 inches, except that the maximum temperature at which the mold is held is 1,800° C. The consolidated billet is cut so that specimens 0.070 inch × 0.070 inch × 1 inch are obtained. The transverse rupture strength is measured on these specimens and is 125,000 pounds per square inch. Hardness is 93.5$R_A$. The density of the hot pressed composition is 4.82 grams per cubic centimeter, which is over 99 percent of the theoretical density. Electron micrographs indicate a very fine grain structure with an average grain size of less than 10 microns.

I claim:
1. A refractory composition consisting essentially of
   1. 10 to 50 volume percent of an oxide selected from among alumina, zirconia and their mixtures; and
   2. 50 to 90 volume percent of a nitride selected from among titanium nitride, zirconium nitride, hafnium nitride, tantalum nitride and their mixtures;

said composition having a density in excess of 95 percent of its theoretical density and an average grain size of less than 10 microns.

2. A composition of claim 1 in which the density exceeds 99 percent of theoretical and the average grain size is less than 2 microns.

3. A composition of claim 1 in which the oxide is present in amounts of from 20 to 40 volume percent and the nitride is present in amounts of from 60 to 80 volume percent.

4. A composition of claim 1 in which the oxide is alumina and the nitride is titanium nitride.

5. A composition of claim 2 in which the oxide is present in amounts of from 25 to 35 volume percent and the nitride is present in amounts of from 65 to 75 volume percent.

6. A composition of claim 5 in which the oxide is alumina and the nitride is titanium nitride.

* * * * *